United States Patent [19]

Calagui

[11] Patent Number: 4,622,773
[45] Date of Patent: Nov. 18, 1986

[54] FISHING LURE ASSEMBLY WITH EXPLOSIVE PROJECTILE

[76] Inventor: Juanito B. Calagui, P.O. Box 46229, Fahaheel, Kuwait, E-15

[21] Appl. No.: 701,688

[22] Filed: Feb. 14, 1985

[51] Int. Cl.$^4$ .................... A01M 27/00; A01K 83/00
[52] U.S. Cl. ...................... 43/43.16; 43/84; 43/1; 43/42
[58] Field of Search .............. 43/6, 84, 42, 1, 37, 43/42.06, 43.16; 102/371; 42/1 L, 1 TB

[56] References Cited

U.S. PATENT DOCUMENTS

| | | | |
|---|---|---|---|
| 1,677,394 | 7/1928 | Maki | 42/1 TB |
| 2,253,125 | 8/1941 | Heineke | 43/43.16 |
| 2,295,042 | 9/1942 | Llewellyn | 43/42.06 |
| 2,512,252 | 6/1950 | Lehn | 42/1 TB |
| 2,541,782 | 2/1951 | Rodin | 43/42 |
| 2,544,782 | 3/1951 | Fawcett | 43/36 |

FOREIGN PATENT DOCUMENTS

| | | | |
|---|---|---|---|
| 90104 | 12/1960 | Denmark | 43/43.16 |
| 79663 | 11/1962 | France | 43/43.16 |

*Primary Examiner*—Nicholas P. Godici
*Assistant Examiner*—Kurt Rowan
*Attorney, Agent, or Firm*—Kerkam, Stowell, Kondracki & Clarke

[57] ABSTRACT

A baitless fishing lure for use in catching large ocean-going fish. The lure is armed with an explosive cartridge for incapacitating the fish by means of a drugged projectile or killing the fish with a bullet-like projectile. The lure is adapted for trolling and comprises a barrel having pivoted hooks extending therefrom adjacent the muzzle end through which the cartridge is fired. The cartridge is fired by the independent action of an internal hammer assembly acting on a firing pin assembly, the hammer being manually cocked by a removable cocking assembly to a trigger assembly that in turn is activated by the fisherman only if the fish is actually hooked.

18 Claims, 2 Drawing Figures

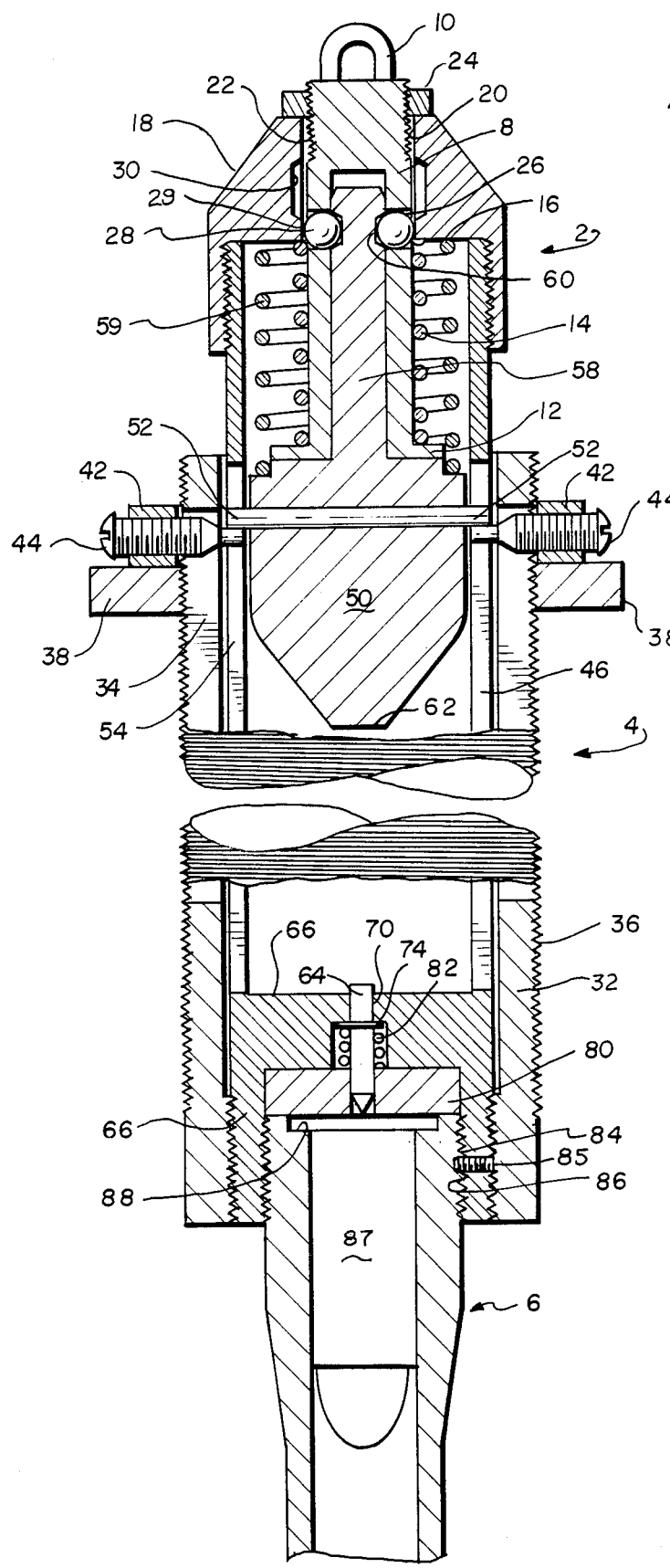

FISHING LURE ASSEMBLY WITH EXPLOSIVE PROJECTILE

BACKGROUND OF THE INVENTION

This invention relates to fishing lures used for catching large ocean fish in which a fish hook assembly operates as a lure for the fish in the course of trolling the assembly from a moving boat, while a projectile fired upon hooking the fish incapacitates the fish.

Baitless lures comprise shiny surfaces and/or plummage of a sort for attracting the attention of the fish while moving through the water. Bait can be attached to the hook assembly of the lure for additionally testing the olfactory sense of the fish; however, an appeal to the visual sense often proves sufficient, and in most cases such lures are used in a baitless manner. In the course of hooking a large fish, such as a shark, marlin, tuna, swordfish and the like, there is a considerable amount of struggle involved, often requiring up to three or four hours of strenuous physical activity on the part of the fisherman to land the fish. It is not uncommon for the fish to free itself during the course of the struggle. Such a struggle on the part of the fisherman and the fish is indeed considered to be an essential part of the sport normally associated with such enterprises. On the other hand, in the commercial realm of fishing for large fish as a source of food, or hunting unique specimens for display in aquariums, the element of sport is of minimum importance and it is desirable to "land" the fish as quickly as possible in a relatively efficient and hazard-free manner as well as in a painless and humane manner. There is therefore a need for providing fishing lures which will insure an escape-free strike by the fish being sought for food or show, a lure which will insure that the fish is not only caught but stays caught and, as well, offers little or no struggle while it is being landed and therefore is subject only to minimal pain.

SUMMARY OF THE INVENTION

It is a general purpose and object of the present invention to provide a fishing lure for use in catching large fish which will satisfy the aforementioned needs.

It is a further object of the present invention to provide a baitless lure which is "armed" and is designed to fire at the moment a large fish is hooked so that the fish is virtually incapacitated.

It is a further object of the present invention to provide an "arming" mechanism for a fishing lure which permits the lure to be cocked ready for firing under the control of the fisherman while the lure is in the water.

In carrying out the principles of the invention there is provided a hooking assembly structure which can be cocked or armed before use and loaded with a live cartridge, a .38 caliber bullet for example, and in this condition trolled through the water in the normal mode of trolling behind a moving boat. The device according to the invention is preferably constructed of stainless steel so that it resists corrosion and retains a shiny appearance and therefore functions as a visually appealing lure to the fish while trolling through the water. The invention allows for the cartridge to be fired under control of the fisherman after the lure is struck and the fish hooked, that is, at the moment the fisherman feels the strike and pulls or jerks the line connected to the lure to hook the fish.

In particular, the invention comprises a cartridge carrying barrel-like assembly having a multiple hook sub-assembly affixed thereto. The barrel portion of the lure communicates with a hammer assembly axially movable within a cylindrical main housing. The hammer assembly may be cocked or "armed" by a removable arching mechanism. To this end, the hammer is pushed against a spring bias at one end of the main housing until a knotched finger portion thereof engages a trigger catch assembly in the trigger housing of the device that communicates with the other end of the main housing. A ring extends through the trigger housing and is adapted to be secured to the leather line or wire which pulls the lure through the water. The trigger assembly is designed to release a catch holding the finger portion of the hammer assembly when the catch is suddenly jerked out of its engaging or locking position by a sudden jerk of the line by the fisherman. The hammer assembly moves independently and swiftly towards a firing pin disposed at the other end of the main housing to effect firing of the cartridge.

The invention will be better understood as well as further objects and advantages thereof become more apparent from the ensuing detailed description taken in conjunction with the drawings.

BRIEF DESCRIPTION OF THE DRAWINGS

FIG. 2 is a cross sectional view of the lure according to the invention.

DETAILED DESCRIPTION

Figure 1:
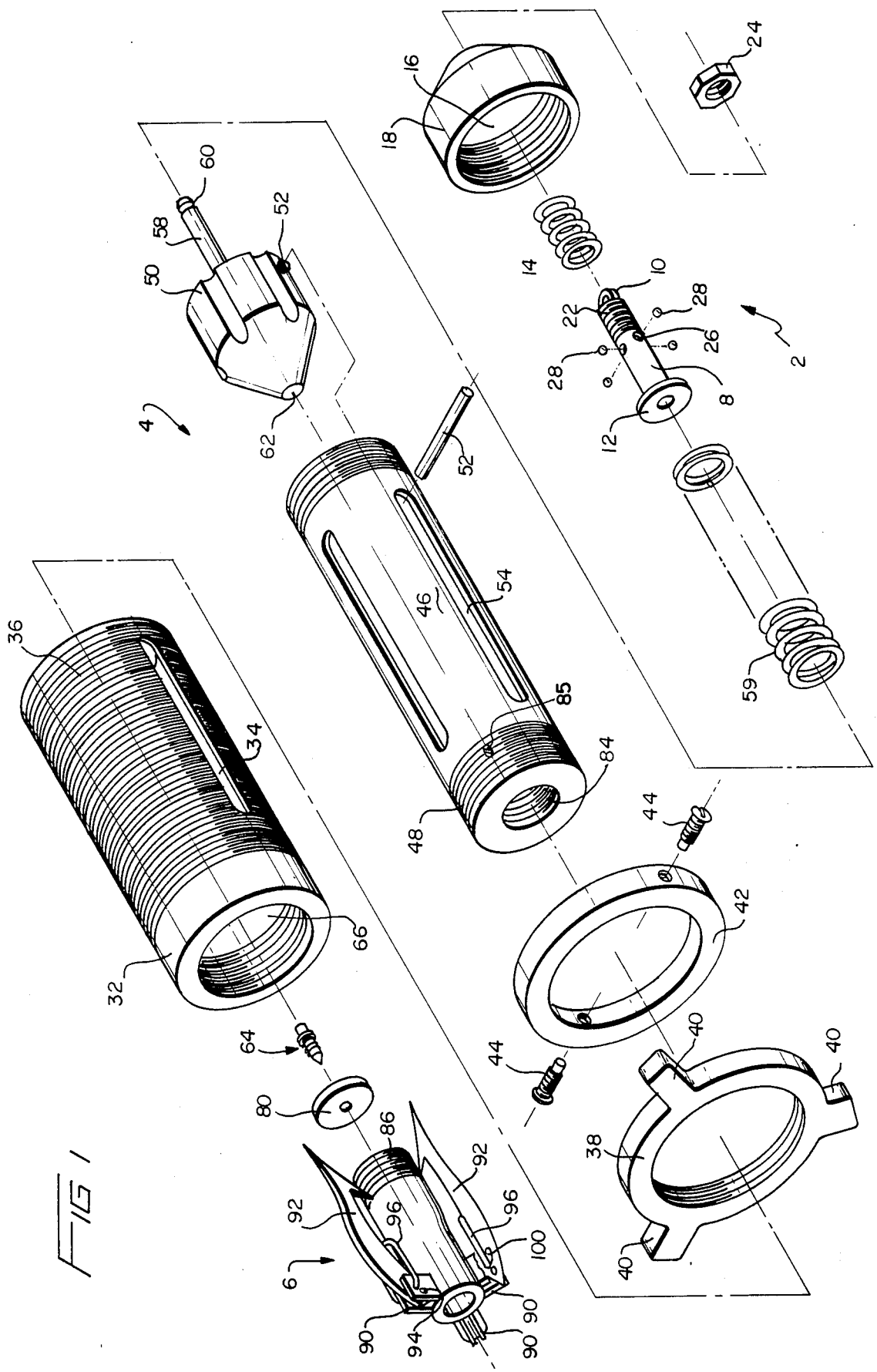
FIG. 1 is an exploded perspective view of the fishing lure embodiment according to the principles of the invention.

Referring now to FIGS. 1 and 2, the fishing lure of the present invention is shown as comprising three parts, namely, a trigger assembly 2, a hammer housing portion 4 and a barrel assembly or portion 6. Proceeding first with a description of the trigger assembly 2, there is a bushing member 8 which has an eyelet or ring 10 at one end thereof and a flanged portion 12 at the other end thereof for supporting one end of a coil spring 14. Coil spring 14 is supported about the external surface of bushing 8 and at its other end engages a flat internal surface 16 within a trigger housing 18. The bushing 8 is seen to extend through a center hole 20 of the housing 18 so that its top threaded portion 22, as best seen in FIG. 2, can receive a screw nut 24. Threading of nut 24 on threaded portion 22 causes the housing spring 14 to be biased or compressed between flange 12 and surface 16.

The bushing 8 is hollow on the interior thereof for a substantial portion of its length and is further provided with at least three equally spaced holes 26 which communicate with the interior axial space thereof. Three (or more) steel balls 28 are provided for respectively engaging the holes 26 so that the balls protrude into the axial interior space of the bushing 8 for the purposes to be described shortly. The interior of the trigger housing 18 between the interior flat surface 16 and the topmost portion of the center hole 20 is provided with an annular groove 30 to accommodate lateral movement of the balls 28 to release the catch and thereby trigger the lure device.

The hammer housing portion 4 of the lure device is adapted to receive an outer cylindrical arming housing 32 having a pair of axially extending slots 34 therein which facilitates arming of the lure. The outside surface of the housing 32 is threaded as at 36 for receiving in threaded engagement therewith a threaded ring 38 having two or more lugs 40 extending therefrom. Lugs 40 enable the ring to be readily rotated and thus axially moved along the cylindrical housing 32. Another ring 42 has a diameter larger than the outer diameter of threads 36 to enable it to be slidably mounted on the cylindrical housing 32. Ring 42 has a pair of diametrically opposed carrier screws 44 threadingly received in diametrically opposite threaded holes 45 and extending therethrough so that they can be received in the respective diametrically opposite slots 34. A main cylindrical housing 46 is seen to fit within the interior of the removable outer housing 32 and is threadingly engaged therewith at one end by an outer threaded portion 48 which is threadingly received in an internally threaded section at one end of the outer housing. The main housing 46 slidably supports within the interior thereof a cone-shaped hammer assembly 50 which has a pair of diametrically opposed lug or ear members 52 which may be formed by passing a rod through a channel in hammer assembly 50 as shown. Ear members 52 extend through a respective pair of elongated slots 54 provided in the housing 46 such that the hammer assembly is captive in housing 46. Slots 54 are aligned with the slots 34 in the removable outer housing 32. The lugs 52, however, do not extend through the slots 34 but only extend far enough to traverse the space defined by the slots 54. In this way, the carrier screws 44 when threaded inward sufficiently can engage the lugs 52 on the underside thereof and thereby carry or force the lugs along the aligned slots and move the hammer assembly to its upper cocked position, as will be explained in greater detail below.

Extending upwardly from the center of hammer assembly 50 is an elongated stem or finger member 58 which has an annular groove 60 therein near the top of the stem member, as shown. A spring 59 extends from a shoulder seat at the top of the hammer 50 as viewed in FIG. 2 to the flat surface 16 of housing 18. The pin member 58 extends into the interior of the bushing 8 and is retained thereon against the bias of spring 59, which when in place allows the balls 28 to engage or be seated in the annular groove 60 in stem 58 and thus grip the stem member and hold it in place. If the ball members 28, however, are allowed to shift laterally, for example, as when bushing 8 is raised slightly to cause the balls to enter the annular space or groove 30, then the gripping action is in effect negated and the stem 58 is allowed to move axially (downwardly as viewed in FIG. 2) under control of the spring 59, as will be explained in detail below.

The tip of the hammer assembly 50 is truncated, that is, the hammer tip has the shape of a truncated cone, and the flat surface 62 provided by the truncation of the cone is the portion of the hammer adapted to strike a firing pin assembly 64 located at the other end (bottom portion as viewed in FIG. 2) of the main housing 46, as best shown in FIG. 2. For this purpose an impact member 66 is disposed adjacent the terminus of the slots 54 which defines a bottom flat surface of the inner housing 46. A center bore 70 is provided in the impact member 66, through which bore extends one end of shaft 64 of a firing pin. The pin itself comprises shaft 64 having cylindrical shaped pin and tip portion 72 in the shape of a cone at its other end. Near the end remote from the tip 72 is an annular flange 74. The firing pin assembly shaft 64 is inserted into the center bore 70 of the impact member 66 with flange 74 received in a counterbore 75 so that the end of the shaft 64 extends only slightly beyond the flat surface of the impact member 66. When the firing pin assembly is in place, a spacer disc 80 with a centering bore therein is tightly positioned on the underside of the impact member 66. Tip 72 of the firing pin is received in the centering bore and extends therethrough. A coil spring 82 is provided to coaxially embrace the shaft of the pin 64 between the flange 74 thereof and the adjacent top surface of the disc 80 as viewed in FIG. 2. Spring 82 assures that the flat end of the pin 64 always extends just slightly beyond the impact surface of the impact member 66. Located at the lower portion of the impact member 66 are internal threads 84 for threadingly engaging the upper threaded portion 86 of the barrel assembly 6. Also, a set screw 85 is provided in the threaded portion of the impact member 66 which serves to secure the barrel assembly 6 in place and maintain proper alignment of the barrel assembly and position of the loaded cartridge 87. To this end, it should be noted that any displacement of barrel 6 due to slight turning which might occur from vibration could cause displacement of the cartridge 87 and result in misfiring. Screw 85 locks the barrel in place and prevents this from occuring.

The barrel assembly 6 is an open ended cylinder that is designed to house the cartridge 87, preferably a 0.38 caliber cartridge. For this purpose the upper portion thereof is counterbored to provide an annular ridge 88 for accepting the rim of the cartridge, in place in FIG. 2. At the bottom portion of the barrel extending generally at right angles therefrom, as shown in FIG. 1 are three equally spaced apart lugs 90 for pivotally supporting respective hook members 92. Hook members 92 are joined by pinion members 94 extending through the lugs 90. In order that the hook members 92 may be positioned in either a closed or open position and not be allowed to freely swing arcuately therebetween, retainter springs 96 are provided in the form of U-shaped clip members. The ends of member 96 each include lugs which ride in a suitable depressions 100 provided on one side of the hook member 92 so that the hook in effect snaps into a closed or folded position or into an open or extended position.

In order to load the lure for operation the user of the device employs the following procedure. Assuming that the lure assembly in its assembled condition, first turn off the set screw 85 and remove the barrel portion 6 from the main housing 4 by unscrewing it. The next step is to cock the device, that is, to position the hammer above the firing pin. To do this, screw the outer cylinder 32 with the elements 38, 42, 44 to the inner cylinder or main housing 46 and adjust the carrier screws 44 under the lugs or ear members 52 on the hammer 50 and the ring 38 is rotated so that it moves up the main housing towards the trigger assembly 2. The ring 38 bears against the slidable ring 42 and pushes it along axially so that the carrier screws 44 engage the lugs 52 on the hammer 50 and in turn push the hammer axially towards the trigger assembly against the bias of coil spring 59 until the knotched finger or stem 58 enters the bushing 8 sufficiently so that the annular groove 60 snaps into engagement with the ball members 28 housed in the upper part of the bushing. The ball members 28 are kept from expanding or shifting laterally by means of the inside surface 29 forming the entry to the center bore 20 of the trigger housing 18 and are positioned just under the annular groove portion 30 of the trigger housing. Adjustment of this critical position of the ball members with respect to the annular groove 30 is effected by the screw nut 24 coacting with the threaded portion 22 of the bushing 8.

Once the pin 58 is snapped into its cocked position, the slidable ring 42 is slid off the cylinder 32 together with the carrier screws 44 which are adjusted for that purpose, and finally the outer cylinder 32 is unscrewed from the inner cylinder or main housing 46 which thus removes all obstacles between the hammer and the firing pin 64. A cartridge, not shown, is inserted into the barrel with the projective end facing toward the hook assembly part of the barrel. The barrel is then screwed back on the main housing 4 and the set screw 85 is then tightened to thereby lock the barrel assembly 6 in place, the eyelet 10 is threaded to the fishing line leather or wire, and the hooking members 92 are retracted or folded against the barrel so as not to offer unnecessary resistance while being trolled through the water.

In the cocked condition, then, the device according to the invention is trolled through the water. When a large fish strikes, the fisherman to pulls sharply on the fishing line in order to set the hook. In doing so, the bushing 8 is pulled against the bias of the spring 14. It should be noted at this point that the spring 14 requires a rather large force to counteract it, that force in fact which would be required to pull against a holding force on the lure itself, that is, the force of a large fish hooked to the lure. Should the lure not hook the fish, that is, after the strike by the fish the lure slips away from the mouth of the fish, there will be no holding force on the lure to insure that an equal and counteractive force can be exerted on the bushing 8 against the spring 14, and therefore the pin 58 will not be released. However, should the fish be hooked, then the pulling force on the bushing 8 causes it to move axially so that the ball members 28 move into that portion of the trigger housing 18 defined by the annular groove 30, whereupon the ball members 28 shift laterally into the annular groove 30, and disengage themselves from the knotched groove 60. The force of the spring 59 then takes over, propelling the hammer 58 against the firing pin. The firing pin, in a separate and independent movement from the trigger mechanism, fires the cartridge from the barrel 6. The fish is thus incapacitated or killed instantly, depending upon the type of projectile used.

By means of the unique trigger and firing pin assembly, the hammer is always assured of an independent function when released, and this relationship between the hammer and trigger assemblies also assures that it is the fisherman who causes the device to be fired only if a fish is hooked on the line. This particular feature assures that the fish does not trigger or discharge the device.

It shall be understood that metal cartridges are not suited for all underwater environment, that is, a cartridge which is waterproof by virtue of its metal casing. There are, of course, specifically designed waterproof cartridges known in the art that can be used with the invention.

It is to be also understood that such cartridges may not be equipped with life destructive projectiles but rather with a drugged dart, like projectiles designed to incapacitate a fish for a suitable period of time until it is transferred into a tank or an aquarium.

The foregoing relates to a preferred embodiment of the invention, it being understood that other embodiments and variants thereof are possible within the spirit and scope of the invention, the latter being defined by the appended claims.

I claim:

1. A fishing lure for use with a projectile for incapacitating large ocean going fish, comprising;
    a barrel assembly adapted to receive an explosive cartridge, and having a plurality of hooks pivotally secured externally thereof;
    a main housing connected to said barrel assembly, said main housing having a hammer assembly and a firing pin assembly disposed therein, said hammer assembly being independently movable with respect to said firing pin assembly; said firing assembly being movable for contact with an explosive cartridge in the barrel assembly; said hammer assembly including outward extending lugs, said main housing having axially extending slots receiving said lugs and removable means extending into said slots for engaging said lugs on said hammer assembly;
    a trigger assembly connected to said main housing, said trigger assembly including release means for engaging said hammer assembly in a first cocked position and for disengaging said hammer assembly from said first cocked position; and
    means for activating said release means to cause said hammer assembly to move from said first cocked position to a second release position, whereby said hammer assembly is cause to strike said firing pin assembly and thereby caused the cartridge to be fired and a projectile to be discharged from said barrel assembly upon firing of the explosive cartridge.

2. An apparatus according to claim 1, wherein said main housing is a cylinder and said hammer assembly is axially slidable in said main housing, said main housing further having a threaded sleeve portion removably disposed thereon and a manually rotatable ring member engaging said threaded portion for adjusting the axial position of said hammer assembly to said cocked position, whereby said threaded sleeve portion may be removed from said main housing once said hammer assembly is adjusted to said cocked position.

3. An apparatus according to claim 1, wherein said hammer assembly comprises a knotched pin, and said release means comprises a bushing and movable means positioned in said bushing for engaging said knotched pin means in said cocked position.

4. An apparatus according to claim 3, wherein said trigger assembly comprises an annular groove means for accommodating said movable means in said release position.

5. An apparatus according to claim 1, wherein said plurality of hooks are spaced around the periphery of said barrel, and said barrel having a biasing means for retaining said hooks in a first closed, barrel kissing position, or a second open, extended position about the periphery of said barrel.

6. An apparatus according to claim 1, wherein said multiple hooks comprise a plurality of single hooks spaced equi-distantly about the periphery of said barrel.

7. An apparatus according to claim 1, wherein said multiple hooks are pivoted adjacent a muzzle end of said barrel and the points of said hooks extend generally towards said main housing.

8. An apparatus according to claim 1, wherein said barrel assembly, said main housing and said trigger assembly are coaxially aligned to define a generally elongated streamlined structure.

9. A fishing lure for use with a projectile for incapacitating large ocean going fish, comprising;
   a barrel assembly adapted to receive an explosive cartridge, and having a plurality of hooks pivotally secured externally thereof;
   a main housing connected to said barrel assembly, said main housing having a hammer assembly and a firing pin assembly disposed therein, said hammer assembly being independently movable with respect to said firing pin assembly; said firing assembly being movable for contact with an explosive cartridge in the barrel assembly;
   a trigger assembly connected to said main housing, said trigger assembly including release means for engaging said hammer assembly in a first cocked position and for disengaging said hammer assembly from said first cocked position; said hammer assembly comprising a knotched pin, and said release means comprising a bushing and movable means positioned in said bushing for engaging said knotched pin means in said cocked position; and means for activating said release means to cause said hammer assembly to move from said first cocked position to a second release postion; said activating means being located at one end of said bushing including means for threadably and adjustably engaging said trigger assembly whereby said bushing means may be axially positioned with respect to said trigger assembly to thereby adjust the distance between said cocked position and said release position of said release means; whereby upon activation of release means said hammer assembly is caused to strike said firing pin assembly and thereby cause the cartridge to be fired and a projectile to be discharged from said barrel assembly upon firing of the explosive cartridge.

10. An apparatus according to claim 9, wherein said main housing is a cylinder and said hammer assembly is axially slidable in said main housing, said main housing further having a threaded sleeve portion removably disposed thereon and a manually rotatable ring member engaging said threaded portion for adjusting the axial position of said hammer assembly to said cocked position, whereby said threaded sleeve portion may be removed from said main housing once said hammer assembly is adjusted to said cocked position.

11. An apparatus according to claim 9, wherein said trigger assembly comprises an annular groove means for accomodating said movable means in said release position.

12. An apparatus according to claim 9, wherein said plurality of hooks are spaced around the periphery of said barrel, and said barrel having a biasing means for retaining said hooks in a first closed, barrel kissing position, or a second open, extended position about the periphery of said barrel.

13. An apparatus according to claim 9, wherein said multiple hooks comprise a plurality of single hooks spaced equi-distantly about the periphery of said barrel.

14. An apparatus according to claim 9, wherein said multiple hooks are pivoted adjacent a muzzle end of said barrel and the points of said hooks extend generally towards said main housing.

15. An apparatus according to claim 9, wherein said barrel assembly, said main housing and said trigger assembly are coaxially aligned to define a generally elongated streamlined structure.

16. A fishing lure for use with a projectile for incapacitating large ocean going fish, comprising:
   a barrel assembly adapted to receive an explosive cartridge, and having a plurality of hooks pivotally secured externally thereof;
   a main housing connected to said barrel assembly, said main housing having a hammer assembly and a firing pin assembly disposed therein, said hammer assembly being independently movable with respect to said firing pin assembly; so as to contact said firing pin assembly to cause firing of the explosive cartridge;
   a trigger assembly connected to said main housing, said trigger assembly including first means for holding said hammer assembly in a cocked position and for releasing said hammer assembly from said cocked position;
   activating means for activating said first means to cause said hammer assembly to move away from said cocked position to a position, whereby said hammer assembly is caused to strike said firing pin;
   a removable cocking assembly for cocking said hammer assembly, said cocking assembly being removably disposed on said main housing, said main housing being of a generally cylindrical shape, and said cocking assembly is rotatably threaded thereon.

17. A fishing lure according to claim 16, wherein said cocking assembly comprises a slidable ring member, and said slidable ring member comprises adjustable lug member thereon for engaging selected portions of said hammer assembly.

18. A fishing lure as set forth in claim 16, further including means for adjusting the position of the activating means.

* * * * *